US009966882B2

(12) United States Patent
Williams et al.

(10) Patent No.: US 9,966,882 B2
(45) Date of Patent: May 8, 2018

(54) CURRENT SENSOR ERROR COMPENSATION

(75) Inventors: Connel Brett Williams, West Midlands (GB); Christopher David Dixon, West Midlands (GB); Robert James Huxford, West Midlands (GB)

(73) Assignee: TRW LIMITED, Solihull, West Midlands (GB)

( * ) Notice: Subject to any disclaimer, the term of this patent is extended or adjusted under 35 U.S.C. 154(b) by 0 days. days.

(21) Appl. No.: 13/581,933

(22) PCT Filed: Feb. 16, 2011

(86) PCT No.: PCT/GB2011/050303
§ 371 (c)(1),
(2), (4) Date: Jan. 11, 2013

(87) PCT Pub. No.: WO2011/107773
PCT Pub. Date: Sep. 9, 2011

(65) Prior Publication Data
US 2013/0106332 A1 May 2, 2013

(30) Foreign Application Priority Data
Mar. 2, 2010 (GB) .................................. 1003456.9

(51) Int. Cl.
*H02P 6/10* (2006.01)
*H02P 21/00* (2016.01)
(Continued)

(52) U.S. Cl.
CPC ................ *H02P 6/10* (2013.01); *H02P 21/00* (2013.01); *H02P 21/05* (2013.01); *H02P 21/22* (2016.02); *H02P 29/50* (2016.02)

(58) Field of Classification Search
CPC ...... H02P 21/0035; H02P 21/05; H02P 21/06; H02P 25/083; H02P 29/0038;
(Continued)

(56) References Cited

U.S. PATENT DOCUMENTS 4,459,534 A * 7/1984 Nagase ................... H02P 21/08
318/803
4,658,192 A * 4/1987 Casteel ................ H02P 7/2815
318/257
(Continued)

FOREIGN PATENT DOCUMENTS

JP          9056198 A      2/1997
JP       2007306694 A    11/2007
(Continued)

OTHER PUBLICATIONS

Kyung-Rae Cho et al; "Correction on Current Measurement Errors for Accurate Flux Estimation of AC Drives at Low Stator Frequency"; IEEE Transactions on Industry Applications, IEEE Service Center, Piscataway, NJ, US, vol. 44, No. 2, Mar. 1, 2008 (Mar. 1, 2008), pp. 594-603, XP011206331, ISSN: 0093-9994, abstract, paragraphs [0011], [0111], figures 4, 5.
(Continued)

*Primary Examiner* — Bentsu Ro
(74) *Attorney, Agent, or Firm* — MacMillan, Sobanski & Todd, LLC

(57) ABSTRACT

A control system for an electric motor comprises a current sensing means arranged to produce a current sensing output indicative of electric current in the motor, current control means arranged to receive the current sensing output and to output a voltage demand indicative of voltages to be applied to the motor, and current sensing correction means arranged to monitor the voltage demand to measure distortion in the
(Continued)

current sensing output and to generate a correction signal which is arranged to correct the distortion.

16 Claims, 3 Drawing Sheets

(51) Int. Cl.
*H02P 21/05* (2006.01)
*H02P 21/22* (2016.01)
*H02P 29/50* (2016.01)

(58) Field of Classification Search
CPC .. H02P 6/002; H02P 6/18; H02P 1/163; H02P 1/18; H02P 1/46; H02P 2201/09; H02P 23/14; H02P 25/023; H02P 25/025; H02P 25/085
USPC ......... 318/139, 432, 400.23, 400.07, 400.27, 318/503, 504, 568.13, 565; 388/909
See application file for complete search history.

(56) References Cited

U.S. PATENT DOCUMENTS

| | | | | |
|---|---|---|---|---|
| 4,677,364 A * | 6/1987 | Williams | ............... | H02J 3/1864 318/729 |
| 4,692,855 A * | 9/1987 | Kuroiwa | ............... | H02M 7/539 363/131 |
| 5,457,375 A * | 10/1995 | Marcinkiewicz | ....... | H02P 6/085 318/801 |
| 5,811,949 A * | 9/1998 | Garces | ............... | H02M 7/53875 318/448 |
| 6,362,593 B1 * | 3/2002 | Lee | ............... | H02P 27/08 318/722 |
| 6,424,107 B1 * | 7/2002 | Lu | ............... | H02P 6/10 318/432 |
| 6,727,675 B2 * | 4/2004 | Yoshimoto et al. | .......... | 318/700 |
| 6,958,589 B2 * | 10/2005 | Kawaji et al. | ............... | 318/802 |
| 6,998,811 B2 * | 2/2006 | Myers | ............... | H02M 7/53875 318/632 |
| 7,053,569 B2 * | 5/2006 | Takahashi et al. | ...... | 318/400.27 |
| 7,161,323 B2 * | 1/2007 | Ajima et al. | ............... | 318/629 |
| 7,423,397 B2 * | 9/2008 | Katahira | ............... | 318/432 |
| 7,449,859 B2 * | 11/2008 | Bae | ............... | B60L 11/1803 318/400.02 |
| 7,474,067 B2 * | 1/2009 | Ueda et al. | ............... | 318/432 |
| 7,650,760 B2 * | 1/2010 | Nakata et al. | ............... | 62/228.1 |
| 7,847,500 B2 * | 12/2010 | Iwaji | ............... | H02P 6/10 318/432 |
| 7,960,927 B2 * | 6/2011 | Chen | ............... | 318/400.07 |
| 8,378,743 B2 * | 2/2013 | Sheen | ............... | H03F 1/3217 330/10 |
| 8,437,915 B2 * | 5/2013 | Endo et al. | ............... | 701/41 |
| 8,680,798 B2 | 3/2014 | Ueda et al. | | |
| 9,041,334 B2 * | 5/2015 | Williams | ............... | G05B 5/01 318/504 |
| 2003/0090232 A1* | 5/2003 | Ho | ............... | H02P 29/50 318/801 |
| 2004/0079173 A1* | 4/2004 | Neely et al. | ............... | 73/862.333 |
| 2004/0155620 A1* | 8/2004 | Myers | ............... | H02M 7/53875 318/632 |
| 2004/0232863 A1* | 11/2004 | Takahashi et al. | ........... | 318/432 |
| 2004/0232877 A1* | 11/2004 | Kawaji et al. | ............... | 318/802 |
| 2005/0093501 A1* | 5/2005 | Takahashi | ............... | G05B 19/0426 318/568.13 |
| 2005/0146304 A1* | 7/2005 | Ramu | ............... | H02K 1/24 318/701 |
| 2006/0001392 A1* | 1/2006 | Ajima et al. | ............... | 318/432 |
| 2006/0097676 A1* | 5/2006 | Katahira | ............... | 318/432 |
| 2006/0125439 A1* | 6/2006 | Ajima | ............... | B60K 6/26 318/716 |
| 2006/0179859 A1* | 8/2006 | Nakata et al. | ............... | 62/228.1 |
| 2007/0052381 A1* | 3/2007 | Ueda et al. | ............... | 318/432 |
| 2007/0279948 A1* | 12/2007 | Shin | ............... | H02M 7/53875 363/41 |
| 2008/0143288 A1* | 6/2008 | Iwaji | ............... | G11B 19/28 318/722 |
| 2008/0197799 A1* | 8/2008 | Tomigashi | ............... | H02P 6/18 318/768 |
| 2008/0197800 A1* | 8/2008 | Bae | ............... | B60L 11/1803 318/807 |
| 2009/0009127 A1* | 1/2009 | Imamura et al. | ............. | 318/601 |
| 2009/0206902 A1* | 8/2009 | Li | ............... | H02M 1/4225 327/176 |
| 2011/0313590 A1* | 12/2011 | Kake | ............... | H02J 3/38 700/297 |
| 2012/0063922 A1* | 3/2012 | Sano | ............... | F16H 61/0206 417/44.1 |
| 2013/0106332 A1* | 5/2013 | Williams | ............... | H02P 21/00 318/400.23 |
| 2013/0193898 A1* | 8/2013 | Williams | ............... | G05B 5/01 318/504 |
| 2014/0191699 A1* | 7/2014 | Dixon | ............... | H02P 23/14 318/503 |

FOREIGN PATENT DOCUMENTS

| | | |
|---|---|---|
| JP | 2009254032 A | 10/2009 |
| WO | 2009091015 A1 | 7/2009 |

OTHER PUBLICATIONS

Hoshino T et al: "Dead-time voltage error correction with parallel disturbance observers for high performance V/f control", Conference Record of the 2007 IEEE Industry Applications Conference—Forty-Second IAS Annual Meeting IEEE Piscataway, NJ, USA, 2007, pp. 20388-2044, XP002661390, ISBN: 1-4244-1260-9, abstract, figures 3, 7.
Hoshino T; Itoh J-I: "Output Voltage Correction for a Voltage Source Type Inverter of an Induction Motor Drive", Transactions of the Institute of Electrical Engineers of Japan, Part D, vol. 129, No. 9, Dec. 31, 2009 (Dec. 31, 2009), pp. 945-946, XP9153094, ISSN: 0913-6339, figures 1, 2.
Yali Zhou et al: "Research of speed sensorless vector control of an induction motor based on model reference adaptive system", Electrical Machines and Systems, 2008. ICEMS 2008. International Conference on, IEEE, Piscataway, NJ, USA, Oct. 17, 2008 (Oct. 17, 2008), pp. 1381-1384, XP31415941, ISBN: 978-1-4244-3826-6, the whole document.
WO 2011/007773 A3 dated Sep. 9, 2011, part C. Documents Considered to be Relevant.
Chinese First Office Action, Application No. CN201180019255.7, dated Sep. 1, 2014.
Patents Act 1977: Search Report under Section 17, Application No. GB1006404.6, dated Sep. 8, 2010.

* cited by examiner

Measurement Error
(Unknown Disturbance)

CURRENT SENSOR ERROR COMPENSATION

CROSS-REFERENCE TO RELATED APPLICATIONS

This application is a national stage of International Application No. PCT/GB2011/050303 filed Feb. 16, 2011, which claimed priority to Great Britain Patent Application No. GB 1003456.9 filed Mar. 2, 2010, the disclosures of which are incorporated herein by reference in entirety.

BACKGROUND OF THE INVENTION

The present invention relates to the control of electric motors, and in particular to measurement of current in electric motors and the control of electric motors based on current measurement.

A closed loop current controller for an electric actuator typically takes the form shown in FIG. 1, where, using vector control, a voltage is applied to each phase winding of the motor and the resultant generated currents measured. The measured currents are then used by a controller, typically a PI, to control to the requested target current. A signal which gives the electrical position of the motor is also required so that the voltages can be applied at the correct phases at the correct times. In the system of FIG. 1 a position sensor is shown but the present invention is equally applicable to a position sensorless system, where the position signal is estimated from other sensor measurements.

Due to inaccuracies and limitations of the current sensor the measurement process can introduce harmonics into the output signal of the current sensor that are not present in the currents that are being measured. The current controller then reacts to these harmonics in the sensor output to try to remove them, but their removal by the current controller, to give a smooth output from the current sensor, causes the actual currents to contain these harmonics.

Depending on the frequency and amplitude of these unwanted harmonics the torque produced by the motor can be degraded, with the harmonics potentially causing torque ripple and/or acoustic noise.

Current Measurement

Typically two methods of phase current measurement are employed:
1. Phase current sensors, where a current measurement device is placed in each of the phases. (For a three phase system it may be that only 2 phases are measured as the $3^{rd}$ phase can be calculated from the 2 measured phases)
2. Single current sensor, where the current flowing in the DC link is measured at specific points during the PWM duty cycle to allow the current in the 3 phases to be calculated.

The harmonics introduced will be different, depending on the phase current measurement method used. The present invention is applicable to any harmonic introduced by measurement inaccuracies.

Effect of Current Measurement Error

The effect of a distortion on the feedback measurement signal in any closed loop system is well known from standard control theory. The effect is described explicitly below for the case of a motor current controller.

The distortion on the current measurement appears as an unknown disturbance on the current feedback path as shown in FIG. 2. The disturbance will add harmonics to the 'measured current' signal from the sensor. If these disturbance harmonics fall within the bandwidth of the current controller, the current controller will act to reject them by modulating the control (voltage demand) signal in order to cancel them out. This modulation will cause the harmonics to appear on the actual phase currents, even though the harmonics are no longer present in the measured phase current signals. This will lead to unwanted torque ripple at the motor output shaft.

BRIEF SUMMARY OF THE INVENTION

The present invention provides a control system for an electric motor, the system comprising a current sensing means arranged to produce a current sensing output indicative of electric current in the motor, current control means arranged to receive the current sensing output and to output a voltage demand indicative of voltages to be applied to the motor, and current sensing correction means arranged to monitor the voltage demand thereby to measure distortion in the current sensing output, and to generate a correction signal which is arranged to correct the distortion. The correction signal may be arranged to correct the current sensing output.

The distortion may be of one or more specific frequencies which may be one or more harmonics of the motor speed and therefore variable with the motor speed, or may be fixed frequencies which are independent of motor speed.

The motor may have stationary windings and a rotor which rotates relative to the windings. The current sensing means may comprise a current sensor arranged to measure current in the motor windings. The current may be measured as two components in the frame of reference of the windings. The current sensing means may comprise transformation means arranged to transform the measured current into the frame of reference of the rotor, for example as torque-generating and non-torque-generating components.

The current control means may be arranged to output the voltage demand so as to define a demanded voltage in a frame of reference which is stationary, which may be the frame of reference of the windings and defined, for example, as $\alpha$ and $\beta$ components, or in a rotating frame of reference, which may be the frame of reference of the rotor, and defined, for example, as D and Q axis components.

The correction means may be arranged to identify a component of the demanded voltage having a frequency equal to that of the distortion, which may be a harmonic distortion, and to measure the magnitude and phase of that component to measure the distortion.

The correction means may be arranged to transform the demanded voltage, for example using a frequency transformation, so that the identified component becomes a DC component, and to measure the magnitude of the DC component. The correction means may be arranged to generate the correction signal so as to reduce the identified component.

The correction means may be arranged to combine the correction signal with the current sensing output to produce a corrected current sensing output. Alternatively the current sensing means may include a current sensor and the correction means may be arranged to input the correction signal to the current sensor to adjust a parameter of the current sensor.

The control system may be arranged to correct a plurality of components of distortion. For example the components of distortion may be harmonics having different frequencies and/or different signs.

Other advantages of this invention will become apparent to those skilled in the art from the following detailed description of the preferred embodiments, when read in light of the accompanying drawings.

DETAILED DESCRIPTION OF THE INVENTION

Figure 1:
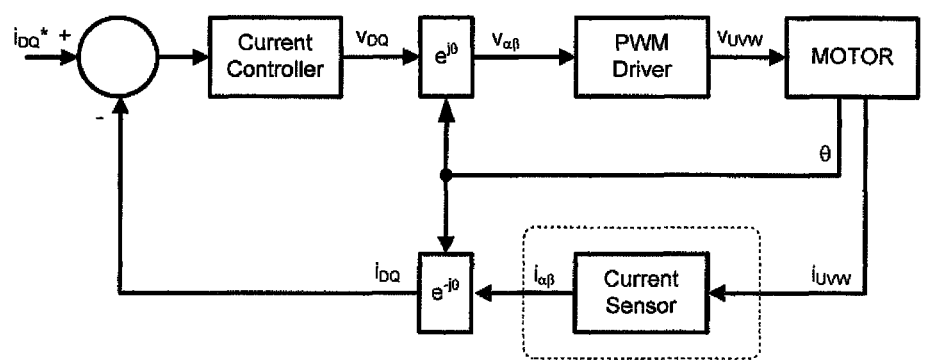
FIG. 1 is a diagram of a known closed loop current control system for a motor.
Figure 2:
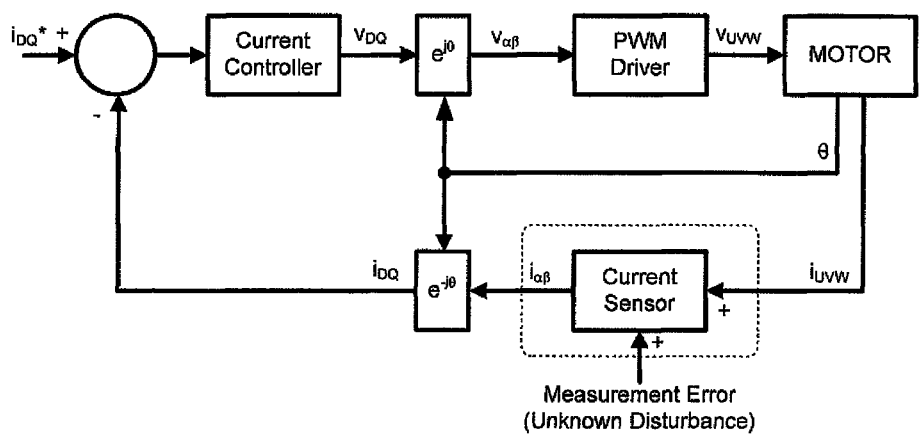
FIG. 2 is a diagram showing how current measurement error affects the system of FIG. 1.
Figure 3:
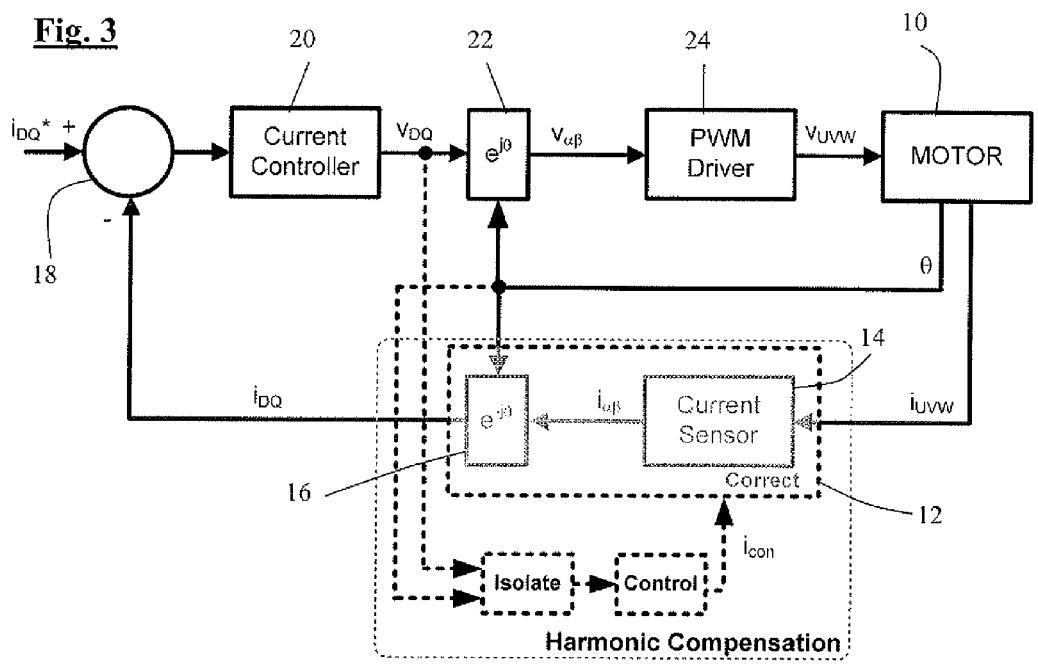
FIG. 3 is a diagram of a closed loop current control system for a motor according to an embodiment of the invention.

Referring to FIG. 3, a motor 10 is controlled by a closed loop motor current control system that, according to an embodiment of the invention, comprises a current sensing system 12 and a current controller 20. A current sensing system 12 comprises a current sensor 14 arranged to measure the currents $i_U$, $i_V$, $i_W$, in the three phases of the motor, which comprise stationary windings, and output a signal indicative of the current vector in the stationary coordinates having α and β components. The current sensing system further comprises a coordinate transformation block 16 arranged to convert the current vector from the α and β components in the stationary reference frame, to D and Q components $i_D$ and $i_Q$ defining the current vector in the rotor reference frame, which rotates relative to the fixed windings, with the Q axis current being the torque generating component and the D axis current being non-torque-generating. A comparator 18 receives the D and Q currents from the current sensing system 12 and compares them with demanded D and Q current components to generate an error. A current controller 20 receives the current error and outputs a demanded voltage vector, in the form of a D and Q axis voltage demand $V_{DQ}$, calculated to reduce the current error so that the measured current vector approaches the demanded current vector. A further transformation block 22 receives the voltage demand from the current controller and converts it to α and β components $V_{αβ}$ which are input to a PWM driver 24 arranged to control a number of switches to apply voltages to the phase windings of the motor in a PWM pattern, which produces the net voltage in the windings having a magnitude and direction corresponding to the voltage demand vector.

The current sensor 14 in this system produces harmonic interferences as described above. The current measurement error is not observable in the current error signal input to the controller 20. However, if the disturbance harmonic falls within the bandwidth of the current controller 20 it will be observable on the controller (voltage demand) signal output from the current controller 20.

The control system is therefore arranged provide a harmonic compensation function. To achieve this it is arranged to monitor the voltage demand, in this case by monitoring $V_{DQ}$, to measure the harmonic interference, and apply a correction to the current measurement signal output from the current sensor 14 such that the measurement error is removed. The compensation process that the control system is arranged to perform can be broken down into three steps:

1. Isolation—Monitoring the voltages demanded by the current controller 20 and isolating the unwanted frequencies.
2. Control—Generating a control (cancellation) signal arranged to reduce the unwanted harmonics to zero.
3. Correction—Applying the control (cancellation) signal to the current measurement system in a closed loop.

Isolation

Although a number of techniques may be used to isolate the unwanted harmonics, such as a runtime Fast Fourier Transform or notch filter, the approach used in this embodiment is to use a synchronous filter that is arranged to transform the control voltage demand to the isolation frequency reference frame. This allows the unwanted harmonic, which is in this case assumed to be a single harmonic of known frequency, to be isolated simply.

Figure 4:
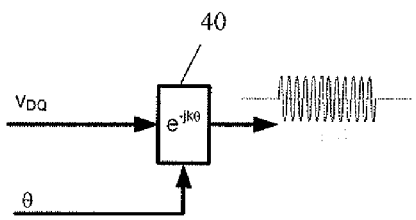
FIG. 4 is a diagram of a synchronous filter forming part of the system of FIG. 3.

FIG. 4 shows one implementation of a synchronous filter 40, which receives as inputs the current controller output voltage demand $V_{DQ}$, the motor electrical position θ and the harmonic k (relative to the motor electrical frequency) to be isolated. Note that k can be positive or negative depending on whether the targeted harmonic is a positive or negative sequence component (i.e. whether it travels in the same direction as the rotor or the opposite direction).

The transformation $e^{jkθ}$ performed by the filter 40 is defined as:

$$y(t) = e^{jkθ} u(t) = \begin{bmatrix} \cos(kθ) & \sin(kθ) \\ -\sin(kθ) & \cos(kθ) \end{bmatrix} u(t)$$

where u(t) is the input to the filter 40, y(t) is the output, and θ is the electrical position of the motor.

Figure 5:
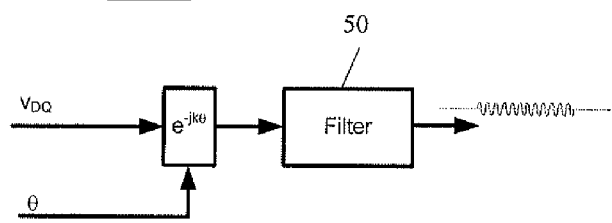
FIG. 5 is a diagram of a filter arrangement similar to that of FIG. 4 but with a further filter component.

The transformed signal output by the synchronous filter 40 will contain DC and AC components. The DC component is the quadrature component of the target harmonic. The AC components are caused by all of the other harmonics in the original signal. If the DC component is zero then the isolation frequency is not present in the current controller output voltages. As shown in FIG. 5, if necessary a filter 50 may be added to the control path at the output of the synchronous filter 40 to help to attenuate the unwanted AC components so that the DC component can be more easily isolated.

Although this technique has been described in relation to the removal of harmonics associated with the motor electrical frequency it may be also be used to remove fixed frequency distortion. In this situation the angular input is generated at a fixed frequency and not derived from the motor electrical position.

Control

As previously described with reference to FIGS. 4 and 5, the synchronous filter 40 produces a signal where the DC component is the magnitude of the unwanted harmonic. If the DC component is zero then the harmonic is not present.

The aim of the control step of the process is therefore to generate a correction signal(s) which can be fed back into the current sensing system to reduce the DC component of the synchronous filter output to zero. A number of controllers may be used to perform this step, but the preferred solution is a controller of the standard PID form.

Correction

Referring back to FIG. 3, once the required control action has been calculated the corrective action must be applied to the current sensing system. This can be achieved in a number of ways including:

1. Apply a sinusoidal correction to the current measurement, i.e. to the current sensor output, in anti-phase with the unwanted harmonic to cancel out the harmonic.
2. Modify the current measurements directly (for example to compensate for a gain or offset measurement error)

Solution 1 is suitable for most or all situations and has the advantage that it is inherently linear. Solution 2 is most suitable when there is a monotonic (and preferably linear) relationship between the isolated harmonic signal and the parameter being modified (e.g. the gain or offset of the signal). However there are many situations where this is not the case, in which case solution 1 may be preferred.

Harmonic Cancellation

Figure 6:
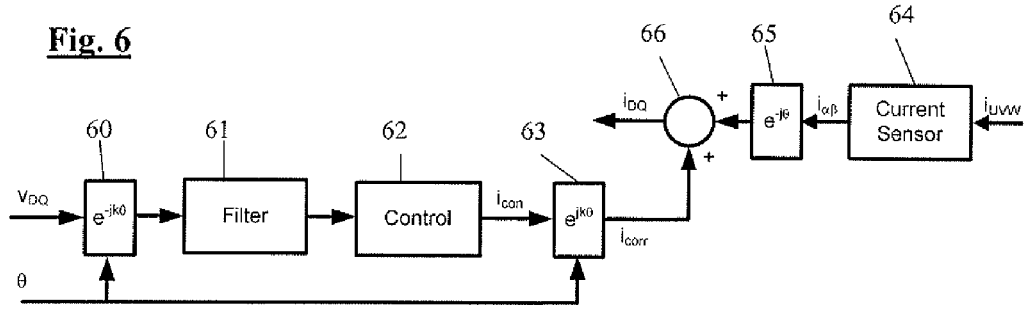
FIG. 6 is a diagram of part of the system of FIG. 3 arranged to correct D and Q axis current measurements.

In many cases, the preferred solution is to cancel out the harmonics by adding the correction signal to the current measurement signal in anti-phase with the unwanted harmonic. FIG. 6 shows a scheme to achieve this. This comprises a synchronous filter 60 with a filter 61 filtering its output similar to that of FIG. 5. A controller 62 receives the output from the synchronous filter 60, after filtering by a filter 61, and calculates the DC correction $i_{con}$ required to reduce the DC component of the synchronous filter output to zero. A transformation block 63 performs a transformation which is the inverse of that performed by the synchronous filter to convert this DC correction to a sinusoidal correction signal $i_{corr}$ equal to the unwanted harmonic. An adder 66 adds the sinusoidal correction signals to the DQ axis current measurement output by the current sensing system, which comprises a current sensor 64 and coordinate transformation block 65 similar to that of FIG. 3. This correction signal therefore has the correct amplitude and phase to cancel out the measurement error.

Direct Compensation

Figure 7:
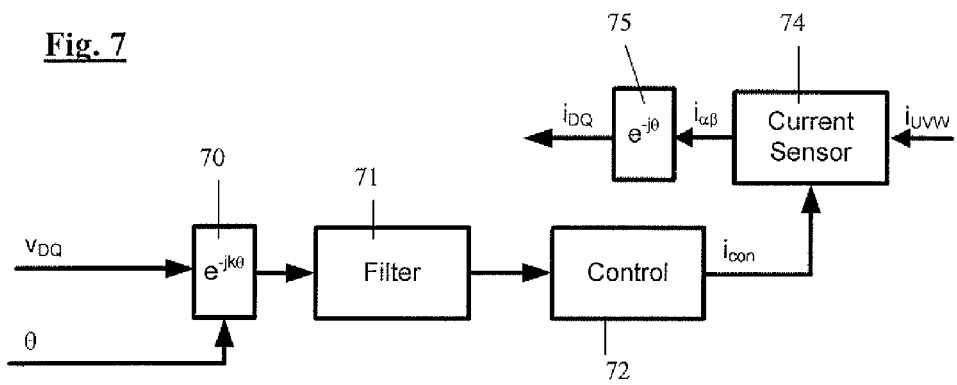
FIG. 7 is a diagram of part of a system of a further embodiment arranged to correct operation of the current sensor directly.

Referring to FIG. 7 in a system according to a further embodiment of the invention a synchronous filter 70 with output filter 71 correspond to those of FIG. 6. However the controller 72 which receives the filtered output from the synchronous filter 70 is arranged to calculate, from the measured magnitude of the target harmonic, a control output $i_{con}$ which is input directly to the current sensor 74 to control a parameter (such as gain or offset) of the current sensor 74 so that the current sensor's output, which is transformed to the DQ axis currents by a coordinate transformation block 75, will have the unwanted harmonic removed.

Scheduling of the Correction Algorithm

A limitation of the techniques described above is that at low motor speeds the DC component cannot be easily isolated (and at zero speed is impossible to isolate). As a result a limit should be placed on the minimum electrical frequency at which the algorithm may operate. Similarly, it may be necessary to have an upper operating speed for the algorithm to avoid aliasing problems if the sample rate of the algorithm is not sufficiently high.

To minimise torque disturbances during the enabling and disabling of the algorithm the use of hysteresis on the operating speed limits may be used and/or the control action may be ramped on and off linearly over a period of time (or number of electrical cycles).

When the algorithm is disabled a number of options are available, and the control system may be arranged to do any one or more of the following:

1. Fix the control action at the last calculated value (for the harmonic compensation algorithm the variation of position will still continue to generate the corrective action at the required harmonic frequency).
2. Switch to an alternative harmonic compensation algorithm.
3. Disable the harmonic compensation completely.

Compensating More than One Harmonic Simultaneously

Figure 8:
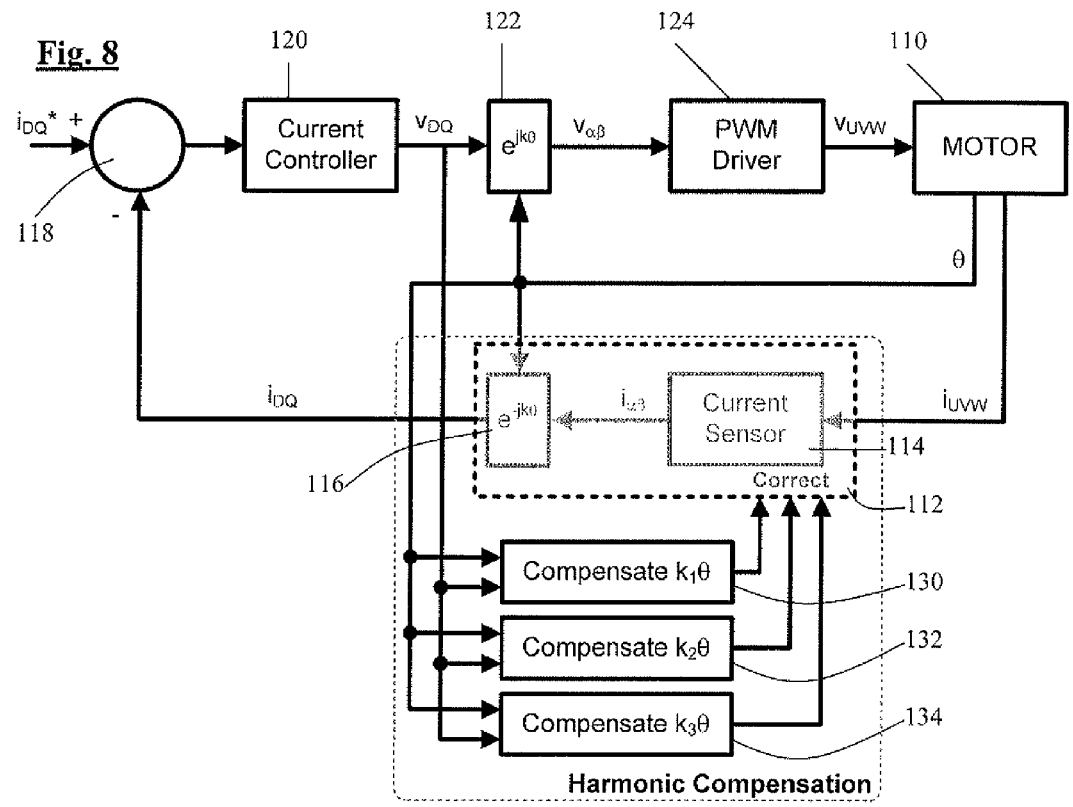
FIG. 8 is a diagram of a control system according to a further embodiment of the invention.

It is common for current measurement errors to lead to distortions at several harmonic frequencies. This algorithm can cancel several frequencies simultaneously by combining multiple harmonic compensation algorithms in parallel. This is because the harmonic compensation controllers operate completely independently at different frequencies. Referring to FIG. 8, a motor control system according to a further embodiment of the invention comprises identical components to that of FIG. 3, with corresponding components indicated by the same reference numerals increased by 100. In this embodiment the complete harmonic compensation algorithm comprises three sub-algorithms 130, 132, 134 all operating in parallel. Each of these sub-algorithms can correspond either to that of FIG. 6 or FIG. 7 and each is arranged to isolate and correct a different harmonic frequency. It will be appreciated that the number and order and sign of the harmonics that the compensation sub-algorithms are arranged to correct will depend on the nature of the current sensing system and the harmonic distortions that it produces. For example in some cases there may be two sub-algorithms arranged to correct two harmonics. These can be of the same order and different signs, of different order and the same sign, or of different order and different sign. In some cases there may be three sub-algorithms as shown in FIG. 8. In this case the three harmonics can be made up of two of the same order and opposite sign and one of a different order (and either sign), or three different orders, and all positive, all negative, two negative and one positive, or two positive and one negative.

While in the embodiments described above the voltage demand is monitored in the D,Q axis reference frame, and the harmonic compensation version of the correction is carried out on the D and Q axis current measurement signal, it is equally possible for the voltage demand monitoring to be carried out in the static α and β reference frame, i.e. at the output of the transformation block 22, and the harmonic compensation to be applied to the current sensor output in the α and β reference frame, i.e. as it is output by the sensor 14 and before it is input to the transformation block 16.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A control system for an electric motor, the control system comprising:
    a current sensing means arranged to produce a current sensing output indicative of electric current in the motor,
    a current control means arranged to receive the current sensing output and to output a voltage demand indicative of voltages to be applied to the motor, and
    a current sensing correction means arranged to monitor the voltage demand, measure distortion in the current sensing output, and generate a correction signal which is arranged to correct the distortion.

2. The control system according to claim 1 for a motor having stationary windings and a rotor which rotates relative to the windings, wherein the current sensing means comprises a current sensor arranged to measure current in the motor windings and transformation means arranged to transform the measured current into the frame of reference of the rotor.

3. The control system according to claim 1 wherein the current control means is arranged to output the voltage demand so as to define a demanded voltage in a frame of reference which rotates.

4. The control system according to claim 3 wherein the correction means is arranged to identify a component of the demanded voltage having a frequency equal to that of the distortion, and to measure the magnitude of that component to measure the harmonic distortion.

5. The control system according to claim 4 wherein the correction means is arranged to transform the demanded voltage so that the identified component becomes a DC component, and to measure the magnitude of the DC component.

6. The control system according to claim 4 wherein the correction means is arranged to generate the correction signal so as to reduce the identified component.

7. The control system according to claim 1 wherein the correction means is arranged to combine the correction signal with the current sensing output to produce a corrected current sensing output.

8. The control system according to claim 1 wherein the current sensing means includes a current sensor and the correction means is arranged to input the correction signal to the current sensor to adjust a parameter of the current sensor.

9. The control system according to claim 1 which is arranged to correct a plurality of components of distortion.

10. The control system according to claim 9 wherein the components of distortion are harmonics having different frequencies and/or different signs.

11. A control system for use with an electric motor comprising:
    a current sensor that generates an output that is indicative of an electric current in an electric motor;
    a current controller that receives the output from the current sensor and generates a voltage demand that is indicative of voltages to be applied to the electric motor; and
    a current sensing correction circuit that is responsive to the voltage demand for measuring distortion in the output from the current sensor and for generating a correction signal that corrects the distortion in the output from the current sensor.

12. The control system according to claim 11 wherein the current sensing correction circuit is responsive to the voltage demand for (1) identifying a component of the voltage demand having a frequency equal to that of a harmonic distortion, (2) measuring a magnitude of the component of the voltage demand to measure the harmonic distortion, (3) generating a correction signal from the measured harmonic distortion that is dependent on the measured magnitude, and (4) combining the correction signal with the current sensing output to produce a corrected current sensing output in which the harmonic distortion is reduced.

13. The control system according to claim 12 wherein the current sensing system includes a current sensor that generates an output that is indicative of an electric current in an electric motor, and a coordinate transformer that converts the output of the current sensor from a stationary frame of reference to a rotor frame of reference.

14. The control system according to claim 13 wherein further including a coordinate transformer that converts the error signal from a rotor frame of reference to a stationary frame of reference.

15. A control system for use with an electric motor comprising:
    a current sensing system that generates an output that is indicative of an electric current in an electric motor that contains a distortion;
    a comparator that compares the converted output of the current sensor with a voltage demand and generates an error signal in response thereto; and
    a current controller that is responsive to the error signal for generating a demanded voltage vector to the electric motor that corrects the distortion in the output from the current sensor.

16. The control system according to claim 15 wherein the comparator compares the converted output of the current sensor with the voltage demand and generates the error signal in response thereto.

* * * * *